United States Patent [19]
Noren

[11] 3,919,543
[45] Nov. 11, 1975

[54] EMERGENCY LIGHT

[75] Inventor: Don W. Noren, Redwood City, Calif.

[73] Assignee: Noren Products, Inc., Redwood City, Calif.

[22] Filed: June 24, 1974

[21] Appl. No.: 482,386

Related U.S. Application Data

[63] Continuation of Ser. No. 380,659, July 19, 1973, abandoned.

[52] U.S. Cl. ........ 240/46.01; 240/46.39; 240/46.59
[51] Int. Cl.² .......................................... F21V 11/06
[58] Field of Search .......... 240/41.35, 46.39, 46.59, 240/46.01

[56] References Cited
UNITED STATES PATENTS

| | | | |
|---|---|---|---|
| 2,907,249 | 10/1959 | Hjermstead | 240/41.35 R X |
| 3,275,820 | 9/1966 | Szarkowski | 240/46.03 X |
| 3,514,589 | 5/1970 | Huber | 240/46.59 |
| 3,522,424 | 8/1970 | Fritsch | 240/46.39 X |

FOREIGN PATENTS OR APPLICATIONS

| | | | |
|---|---|---|---|
| 1,132,455 | 6/1962 | Germany | 240/36.39 |
| 697,728 | 9/1953 | United Kingdom | 240/46.39 |

*Primary Examiner*—Richard M. Sheer
*Attorney, Agent, or Firm*—Fay & Sharpe

[57] ABSTRACT

A disguised emergency light for use on vehilces. Besides the standard source of light, the light includes an internal light channeling device and a beam splitter and is adapted to fit into standard vehicle light sockets. Predetermined color variations in both the illuminated and non-illuminated condition of the light is disclosed.

8 Claims, 4 Drawing Figures

EMERGENCY LIGHT

This is a continuation of application Ser. No. 380,659, filed July 19, 1973, now abandoned.

The subject invention is directed toward the art of lighting, signaling and similar devices and, more particularly, to an improved, disguised, colored emergency light for use on vehicles.

The invention is especially suited for use as a disguised, colored emergency light for use on private vehicles or for use on unmarked patrol cars and will be described with particular reference thereto; however, as will become apparent, the invention is capable of broader application and could be used for any light source which is required to have different lighting effects between the illuminated and nonilluminated conditions.

Prior to the subject invention, the problem of equipping unmarked patrol cars with emergency lights that would not reveal the disguise of the unmarked vehicle to the casual onlooker has been solved by a variety of methods. One method is the use of suction cups to fasten a demountable light to the car body. However, this solution has proved unsatisfactory in that suction cups have been known to suddenly release their grip without warning and/or suction cups will not function on the vinyl roofs found on many cars.

Another method of equipping unmarked patrol cars with the required emergency lights has been by the use of demountable lights which hang from the rear-view mirror. However, this method has been inconvenient in that in this position the emergency light not only interferes with the driver's concentration but can also interfere with his visibility. As a consequence of such inherent problems, the driver's ability to handle the vehicle in an emergency situation may be impaired.

Handheld lights are also available, but these can be quite dangerous since in an emergency situation the driver must simultaneously concentrate on holding the light in one hand and steering the vehicle with the other hand.

A further problem, generally inherent in all demountable-type emergency lights, is the fact that such lights tend to be of low wattage with small reflectors; consequently, the lights do not generate sufficient candlepower to be readily noticeable, especially in daylight.

Yet another method used has been the mounting of colored, seal-beam type headlights behind the car's grillwork. This method has lower candlepower and has been undesirable due to the great number of varieties of grille designs. Many cars have grilles with designs that are not conducive to passing a light beam; and in such a situation, the light output of the seal-beam is reduced by 30 to 70 percent due to blockage by the opaque parts of the grille. Other grilles are too narrow or positioned too close to the car's radiator to allow for proper mounting of a sealed beam.

The subject invention overcomes the inconveniences commonly found in devices previously used to equip unmarked cars with emergency lights by providing a light structure which has the external appearance of a regular seal-beam type headlight when turned off; but when turned on, emits a bright colored light.

Briefly stated, the subject invention is preferably comprised of a source of light of any predetermined desired color. The light source could be, for example, a tungsten-filament seal-beam bulb with a colored lens or a colored translucent medium placed in the path of the beam of light thrown by such a bulb with a colorless lens. In the preferred embodiment, the light source is a small seal-beam type light with a red lens, but any other suitable light source could be used. Enclosing the source of light is a housing. In the embodiment disclosed, the outer front wall of the housing is comprised of a substantially colorless lens adapted to pass light emanating from the source of light while the outer back wall is comprised of the rear parabolic reflector portion of the seal-beam type source of light. Extending between the front colorless lens and the rear parabolic reflector portion of the seal-beam type light source is an intermediate metal sleeve member which completes the housing and encircles the internal light channeling means.

In the preferred embodiment, a light channeling means and a beam splitter are mounted in the metal intermediate sleeve between the front colorless lens and the seal-beam type light source. The light channeling means functions to align the light rays emanating from the seal-beam type light source into essentially parallel rays. In the preferred embodiment, the light is channeled by a multiplicity of open-ended, hexagonally-shaped passages with their axes extending parallel; however, any other configuration of open-ended, light channeling passages could be used as, for example, round octagonal or square passages. The internal surfaces of the passages are preferably non-reflective since they function to trap sunlight, thereby preventing it from reflecting from the seal-beams reflector and being viewed from outside. This is necessary because any light that enters and is reflected back out will be colored and thereby will give the bulb a colored appearance which is very objectionable.

The beam splitter means is preferably positioned between the channeling means and the front colorless lens and essentially functions like a one-way mirror to disguise the colored light source. In the preferred embodiment, the beam splitter means is comprised of a transparent sheet of ceramic, plastic, or glass that has visually or optically distinct areas of transmission and reflection. The distinct areas of transmission and reflection are preferably achieved by coating or etching one surface of the clear sheet with distinct areas, preferably parallel linear bands or strips, of reflective coating. Although a conventional one-way mirror could be used in the place of the beam splitter, one advantage of the beam splitter is that it can be made to provide any desired level of transmission, whereas a conventional one-way mirror will rarely achieve better than 30 percent surface transmission.

Accordingly, the primary object of the subject patent is the invention of a disguised, colored emergency light for use on vehicles or for use on unmarked patrol cars which, to the casual onlooker, appears to be regular seal-beam type headlights or fog lights.

A further object is the provision of an emergency light of the general type described which can be fabricated simply from relatively standard components.

Yet another object is the provision of an emergency light which is adapted to fit in the standard seal beam headlight sockets.

A still further object is the provision of a light of the type described which is capable of providing any color of light desired; but when turned off, appears to be a conventional headlight.

The above and other objects and advantages will become apparent from the following description when read in conjunction with the accompanying drawings wherein.

Figures 1, 2, 3, 4:
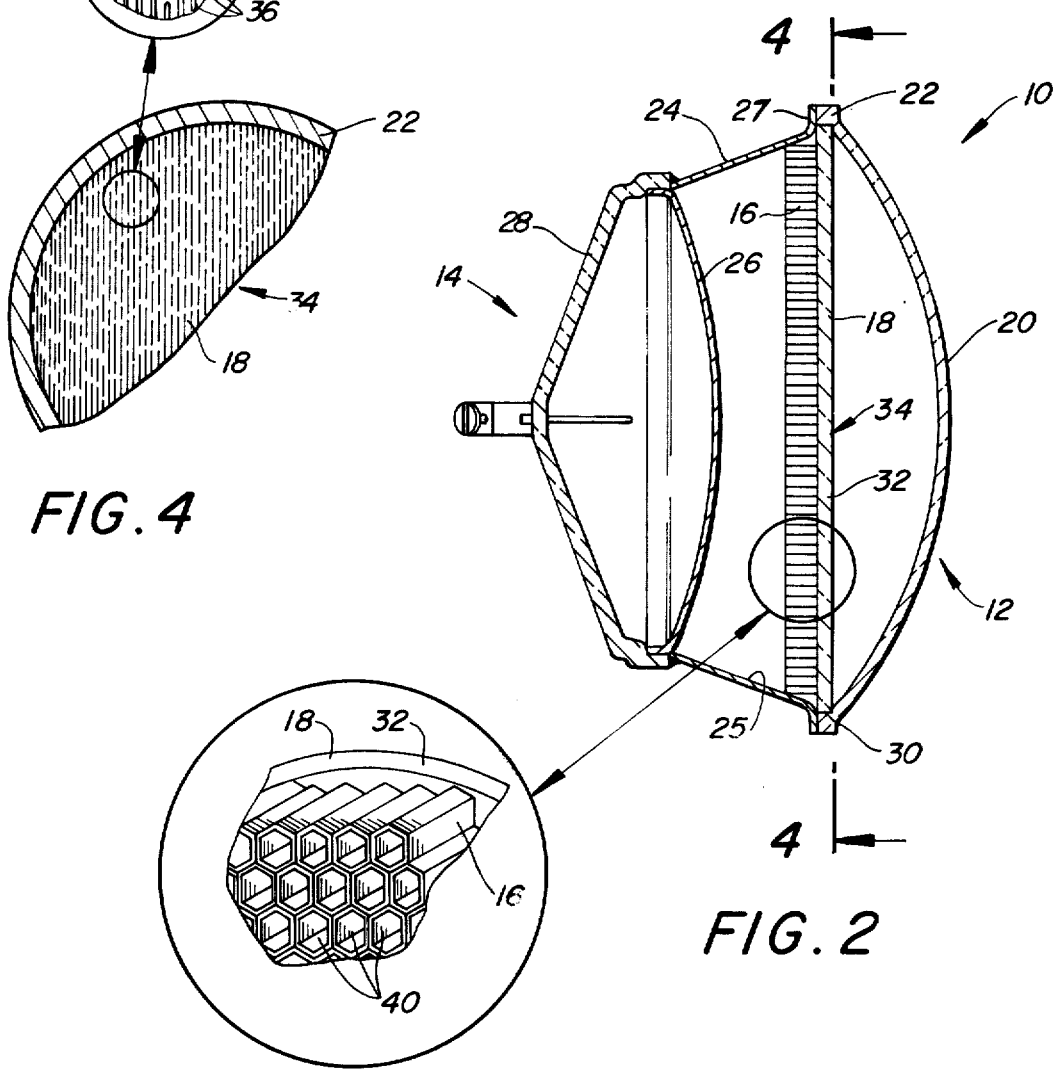
FIG. 1 is a pictorial view of the preferred embodiment.
FIG. 2 is a cross-sectional view taken on line 2—2 of FIG. 1.
FIG. 3 is an enlarged partial pictorial view of the circled area of FIG. 2; and, FIG. 4 is an enlarged partial view taken on line 4—4 of FIG. 2.

Referring more particularly to the drawings wherein the showings are for the purpose of illustrating a preferred embodiment of the invention only, and not for the purpose of limiting same, FIGS. 1 and 2 best illustrate the overall arrangement of the emergency light 10 which is illustrated as including a housing 12, a light source 14, a light channeling means 16, and a beam splitting means 18.

The housing 10 is illustrated as including a substantially colorless lens 20 which, in the preferred embodiment, is identical to that found on a regular seal-beam type headlight. Lens 20 could, of course, vary from the embodiment shown. The purpose of the lens 20 is twofold. First, with the light source 14 in its "on" condition, the lens 20 functions to disperse the beam of light emanating from the light source 14 so that visibility is improved. Secondly, with the light source 14 in its "off" condition, the lens 20 functions to scatter the incident light rays entering at the front of the emergency light 10 that would tend to reflect off the light source 14 and thereby disclose the colored light source 14.

Positioned at the rim of lens 20, along its radially extending flange 22, is an intermediate metal sleeve member 24 which has the general configuration of a truncated cone. As viewed in FIG. 2, the right-hand portion of sleeve 24 has a radially extending flange 27 which has an outermost diameter substantially equal to the outermost diameter of lens 20. The sleeve 24 is preferably fastened to the lens 20 with a high temperature resistant adhesive, as is the case with all other components which require fastening in the preferred embodiment.

Fastened in the left-hand opening of the sleeve 24 (as viewed in FIG. 2) is a light source 14. In the preferred embodiment, light source 14 is a small, seal-beam type light source comprised of a lens 26 and a parabolic reflector 28. The parabolic reflector portion 28 of light source 14 further functions as the outer back wall of the housing 10. Although, in the preferred embodiment, the light source 14 has a red colored lens 26, a colored light source could be achieved by other means. For example, a colored translucent medium could be placed in the path of the beam of light emanating from a light source with colorless lens 26.

Encased within housing 10 are light channeling means 16 and beam splitter means 18. In the preferred embodiment, beam splitter means 18 is fastened to lens 20 along the circumferential groove 30 formed in lens 20. As best shown in FIGS. 2, 3 and 4, beam splitter means 18 is preferably comprised of a clear, transparent member 32 of ceramic, plastic, glass, or other suitable material upon which a reflective coating 34 is placed in parallel bands or strips. Although the reflective coating could vary from that described, it is preferably deposited on the right-hand surface of beam splitter means 18 (as viewed in FIG. 2) and is deposited in such a manner that there occurs visually or optically distinct areas of transmission 36 and reflection 38. Accordingly, the beam splitter functions somewhat like a conventional one-way mirror. Further, although not shown in the preferred embodiment, the coating 34 could be multilayered in a manner such that the beam splitter means 18 appears colored. For example, the coating 34 could consist of the reflective areas 38 as previously described, over which colored strips or bands could be deposited. Should colored strips or bands be superimposed over the reflective strips or bands, the emergency light could be made to look like a yellowish fog light; for example, when in the "off" condition, but could nevertheless appear as a red light (due to a red light source) when in the "on" condition.

According to the preferred embodiment, light channeling means 16 is mounted along with beam splitter means 18 in the intermediate metal sleeve 24. The beam splitter is affixed by a high temperature resistant adhesive, as previously mentioned, to the left-hand face of beam splitter means 18. As best shown in FIGS. 2 and 3, the light rays emanating from light source 14 are passed through a grating of thin-walled, highly-reflective cellular passages 40 so that they are essentially directed into parallel rays before passing through beam splitter means 18. The cellular passages 40 are preferably open-ended and hexagonally shaped, although any other suitable open-ended passage could be employed, with their axes extending parallel to one another and at the same time perpendicular to the beam splitter means 18. The channeling means not only serves to direct the light emanating from light source 14 through beam splitter means 18, but also functions to prevent the influx of stray outside light which would tend to expose the colored light source.

Although the relationship between the beam splitter means 18 and light channeling means 16 could vary widely from that shown, the light channeling means 16 is preferably as close to being the same diameter as the beam splitter means as possible. Obviously, the major limiting factor is the inner diameter of intermediate sleeve 24.

The intermediate sleeve 24 functions to carry the beam splitter means 18 and light channeling means 16, accordingly, although intermediate sleeve 24 is shown as being open-ended and conically shaped, any suitable shape could be used which would fulfill the function of carrying the beam splitter means 18 and light channeling means 16. Further, in the preferred embodiment, the inner surface 25 of the sleeve 24 is highly reflective such that it further functions to promote the maximization of candlepower. As best shown in FIG. 2, the intermediate sleeve 24 is affixed to the light source 14 at its left-hand end. About the right-hand end of intermediate sleeve 24 (as viewed in FIG. 2) is a radially extending flange 26 of substantially the same diameter as flange 22 of lens 20. The flange 26 is employed to affix the intermediate sleeve 24 to lens 20.

The invention has been described in great detail sufficient to enable one of ordinary skill in the optics art to make and use the same. Obviously, modifications and alterations of the preferred embodiment will occur to others upon a reading and understanding of the specification. It is my intention to include all such modifications and alterations as part of my invention insofar as they come within the scope of the appended claims.

What is claimed is:

1. An emergency light which has the appearance of a regular seal-beam type headlight when turned off and viewed under external illumination; but when turned on, has a distinct predetermined color comprising:
   a source of light of said predetermined color;
   a sleeve adjacent said source of light having an outer end spaced from said source of light, a substantially colorless lens adapted to pass light emanating from said source of light closing the outer end of said sleeve;
   light channeling means positioned within said sleeve between said source of light and said lens for requiring light rays passing between said source and said lens to be essentially parallel, said channeling means preventing the influx of outside light tending to expose said source of light of said predetermined color; and,
   a beam splitter means comprising a one way mirror surface having a multiplicity of small open areas distributed uniformly thereover positioned within said sleeve between said light channeling means and said lens in a separate plane from at least said lens.

2. The emergency light as defined in claim 1 wherein said channeling means comprises a multiplicity of open-ended passages positioned with their axes extending parallel.

3. The emergency light as defined in claim 1 wherein said channeling means comprises a grid member having a plurality of open-ended passages positioned with their axes extending parallel.

4. The emergency light as defined in claim 3 wherein the internal surfaces of said passages are highly reflective.

5. The emergency light as defined in claim 1 wherein said source of light comprises a tungsten filament seal beam bulb having a lens of said predetermined color.

6. The emergency light as defined in claim 5 wherein said light channeling means is mounted in a metal sleeve member extending between said bult and said colorless lens, said sleeve defining a portion of said housing.

7. An emergency light which has the appearance of a regular seal-beam type headlight when turned off and viewed under external illumination; but when turned on, has a distinct predetermined color comprising:
   a source of light of said predetermined color;
   a sleeve adjacent said source of light having an outer end, a substantially colorless lens adapted to pass light emanating from said source of light closing the outer end of said sleeve; and,
   a beam splitter means comprising a one-way mirror surface having a multiplicity of relatively small open areas distributed uniformly thereover disposed within said sleeve intermediate said source of light and said colorless lens in a separate plane from said lens.

8. The emergency light as defined in claim 7 wherein said source of light comprises a seal-beam type headlight in said housing with a colored filter between said headlight and said beam splitter.

* * * * *